3,759,887
PROCESS FOR THE PREPARATION OF POLYMERS OR COPOLYMERS
Hendrik J. Rang and Sjoerd Kaarsemaker, Sittard, Netherlands, assignors to Stamicarbon N.V., Heerlen, Netherlands
No Drawing. Filed July 7, 1964, Ser. No. 380,934
Claims priority, application Netherlands, July 8, 1963, 295,066
Int. Cl. C08f 1/60, 3/04
U.S. Cl. 260—94.9 R          10 Claims

ABSTRACT OF THE DISCLOSURE

Ethylene polymers are prepared by polymerizing ethylene at temperatures above 150° C. and pressures above 500 atmospheres with an organic peroxide of the formula

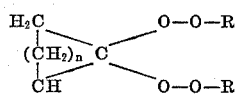

where R is tertiary alkyl and $n$ is an integer from 2 to 5, or with 2,2-bis[4,4-di(tertiary butylperoxy)cyclohexyl] propane.

---

The present invention relates to a process for the preparation of polymers or copolymers of ethylene by heating ethylene, or a mixture of ethylene and one or more other unsaturated compounds copolymerizable therewith to a temperature above 150° C. at a pressure above 500 atmospheres in the presence of an organic peroxy compound serving to initiate the polymerization reaction.

A very large number of peroxy compounds such as capryloyl peroxide, lauroyl peroxide, di-(tertiary butyl-) peroxide, benzoyl peroxide, and tertiary butyl-perbenzoate, are already known as initiators for polymerization reactions of the above-mentioned type and have been marketed for this purpose for many years. With the aid of the initiators known so far, polymers with good mechanical or optical properties can be prepared. They are not suited, however, for the preparation of polymers which satisfy high demands in both respects.

The aim of the invention is to provide a process for the preparation of polymers and copolymers of ethylene from which articles with particularly good optical properties can be made.

Another aim of the invention is to provide such articles which, moreover, possess excellent mechanical properties. The invention particularly aims at providing films which are very clear, and, more particularly, at providing films which are both very tough and very clear.

The process according to the invention for the preparation of polymers or copolymers of ethylene by heating ethylene or a mixture of ethylene and one or more other ethylenically unsaturated compounds copolymerizable therewith to a temperature above 150° C. at a pressure above 500 atmospheres and in the presence of an organic peroxy compound serving to initiate the polymerization reaction, is characterized in that the initiator used is an organic peroxide containing one or more saturated hydrocarbon ring systems, one of the carbon atoms of each ring system being bound to two equal or different groups —O—O—R, wherein R is a tertiary alkyl radical linked to the oxygen atom by a bond of a tertiary carbon atom.

Examples of suitable initiators according to the invention are 1,1-di(tertiary butylperoxy)cyclopentane, 1,1-bis(1,1-dimethylpropylperoxy) 4-methylcyclohexane, 1,1-di(tertiary butylperoxy) 3, 5-diethylcyclohexane, 1,1-bis-(1,1-dimethylpropylperoxy) cyclohexane, 1,1-di(tertiary butylperoxy)cyclooctane, 2,2-bis[4,4-di(tertiary butylperoxy)cyclohexyl]propane, 1,1 - di(tertiary butylperoxy-) cyclohexane. The last-mentioned compound in particular gives very good results.

As a rule, the initiator is employed in an amount of 1 to 5000, and preferably 20–1000 parts by weight per one millon parts by weight of the ethylene or the ethylene-containing mixture to be polymerized.

The process according to the invention can be carried out by the known methods for the polymerization of ethylene according to the high-pressure process. The polymerization can be carried out batchwise, semi-continously or continuously. An autoclave or a tubular reactor may be used as reactor. In addition to ethylene, chain-transfer agents, e.g., hydrogen propane, butane or other hydrocarbons may be present.

The polymerization can be effected at a temperature of 185–240° C., preferably at 195–230° C. The pressure is preferably kept between 500 and 1400 atmospheres, more preferably between 700 and 1300 atmospheres. A speclai advantage of the process according to the invention is that the amount of polymer formed per gram of the initiator used is considerably larger than might be expected in view of the temperatures and pressures used.

The process according to the invention can be used both for the preparation of homopolymers of ethylene and for the preparation of copolymers of ethylene and other ethylenically unsaturated compounds, such as esters or amides of acrylic acid or of α-substituted acrylic acids and vinyl esters of carboxylic acids. Other comonomers that may copolymerized with ethylene have been disclosed in Canadian Pat. No. 510,143.

The polymers according to the invention can, by the known techniques, be shaped into objects and are particularly suited as starting products for the manufacture of films. If used for this purpose, the polymers may contain the customary additives, such as stabilizers, anti-oxidants, anti-blocking agents, anti-statics, lubricants, and U.V.-stabilizers. If so desired, one or more of the said substances may be added in the customary way during the polymerization, suitably in quantities of 0.01–1 percent by weight of the polymer formed.

The invention will be elucidated by means of the following examples. In all the cases cited here, the process was carried out by compressing, upon addition of the initiator and of the anti-oxidant, if any was used, the ethylene to the reaction pressure and, after, supplying it continuously to an autoclave in which the reaction mixture was kept at the reaction pressures and temperature (the melt index of the polymer being regulated by adding propane). Via a control valve the reaction mixture was continuously fed from the autoclave to a seperator where the polymer and the non-converted gases were separated. The reaction conditions and the properties of the polymers obtained in the various experiments are summarized in the following table.

TABLE

| | Polymerization conditions | | | | | | Product properties | | | | |
|---|---|---|---|---|---|---|---|---|---|---|---|
| Experiment Number: | Pressure (kg./cm.²) | Propane in ethylene feed (mol. percent) | Temp., °C. | Initiator | Quantity of Initiator (g./kg. polymer) | Antioxidant | Quantity of antioxidant (g./kg. polymer) | Impact strength (g./μ) | Melt index | Density (g./cm.³) | Opacity (percent) | Gloss (°/∞) |
| 1 | 1,100 | 0.6 | 215 | A | 0.15 | | | 2.6 | 2.8 | 0.9195 | 2.9 | 83 |
| 2 | 1,100 | 0.3 | 215 | A | 0.27 | P | 1.5 | 3.1 | 2.1 | 0.9187 | 2.7 | 81 |
| 3 | 1,100 | 0 | 225 | A | 0.24 | P | 1.5 | 3.9 | 4.3 | 0.9185 | 1.8 | 89 |
| 4 | 1,100 | 0 | 225 | A | 0.22 | Q | 0.5 | 3.3 | 3.2 | 0.9185 | 1.9 | 86 |
| 5 | 1,100 | 0 | 225 | B | 0.33 | P | 1.5 | 4.4 | 3.9 | 0.9186 | 5.1 | 65 |
| 6 | 1,100 | 3.0 | 195 | C | 1.13 | P | 1.5 | 1.9 | 3.5 | 0.9232 | 3.9 | 91 |
| 7 | 1,600 | 5.8 | 215 | A | 0.04 | | | 1.3 | 3.0 | 0.9250 | 7.4 | 63 |

The experiments 1–4 were carried out by the process according to the invention. The experiments 5 and 6, in which other initiators were used and experiment 7, wherein the pressure was much higher than the preferred pressures, are included for comparison.

The initiators A, B and C are 1,1-di-(tertiary butyl-peroxy-)cyclohexane, tertiary butyl perbenzoate and capryloyl peroxide, respectively. The anti-oxidants P and Q are 2.6-di-(tert.butyl)4-methylphenol and 4.4′thio bis (3-methyl 6-tert.butyl phenol).

The properties of the polymer and the films made thereof by extrusion are determined as follows:

Melt index: according to A.S.T.M. Standard D–1238–52–T
Density: according to A.S.T.M. Standard D–1505–57–T
Impact strength: according to A.S.T.M. Standard D–1709–59–T
Opacity: according to A.S.T.M. Standard D–1003–52
Gloss: according to A.S.T.M. Standard D–523–53–T The films were blown on a machine specified below and under the following conditions:

Extruder — Schwabentan, Model SM 20 P/15.
Screw diameter — 2.0 cm.
Screw length — 40 cm.
Screw speed — 70 revolutions/minute.
Temperatures:
  Back of cylinder — 120° C.
  Front of cylinder — 145° C.
  Die — 165° C.
Sieve plate — Mesh size 0.4 mm.
Blow-up ratio — 1.75.
Freeze-line distance — 10 cm.

The thickness of the films was 0.05 mm.

The examples show that the films made from the polymers prepared by the process according to the invention possess favorable combination of great impact strength, low opacity and high gloss, which is not found in the other foils.

If large amounts of the polymers prepared in accordance with the invention are blown to films on the extruders used in the plastics-processing industry, products are obtained possessing a considerably greater impact strength with preservation of a low opacity and a high gloss. In this way, the polymers obtained in Experiments I and III, for instance, can be processed into films having an impact strength of 4.4, and 6.4 g./μ, respectively.

The process according to the invention yields polymers from which films having a gloss of at least 80°/∞ can be made. It is even possible to prepare homopolymers of ethylene suited for production of films which at the same time possess an impact strength of more than 5.5 g./μ thickness and a gloss of at least 70°/∞.

What is claimed is:

1. In a process for the preparation of polymers and copolymers of ethylene by heating a member of the group consisting of ethylene and mixtures of ethylene and at least one other ethylenically unsaturated monomer copolymerizable therewith, to a temperature above 150° C. at a pressure above 500 atmospheres in the presence of an organic peroxy compound serving to initiate the polymerization reaction, the improvement in which said initiator is an organic peroxide having the general formula

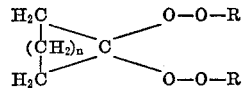

wherein n=2, 3, 4 or 5 and R is a tertiary alkyl radical.

2. In a process for the preparation of polymers and copolymers of ethylene by heating a member of the group consisting of ethylene, and mixtures of ethylene and at least one other ethylenically unsaturated monomer copolymerizable therewith, to a temperature above 150° C. at a pressure above 500 atmospheres in the presence of an organic peroxy compound serving to initiate the polymerization reaction, the improvement in which said initiator is an organic peroxide selected from the group consisting of 1,1-di(tertiary butylperoxy)cyclopentane, 1,1-bis(1,1-dimethylpropylperoxy) 4-methylcyclohexane, 1,1 - di(tertiary butylperoxy) 3,5 - diethylcyclohexane, 1,1-bis(1,1 - dimethylpropylperoxy) cyclohexane, 1,1-di-(tertiary butylperoxy) cyclooctane, 1,1-di(tertiary butylperoxy-)cycloheptane and 1,1-di-(tertiary butylperoxy-)cyclohexane.

3. Process according to claim 2 in which the polymerization is carried out at a pressure between 500 and 1400 atmospheres.

4. Process according to claim 3 in which the polymerization is carried out at a pressure between 700 and 1300 atmospheres.

5. Process according to claim 2 in which the polymerization is carried out at a temperature of 185–240° C.

6. Process according to claim 5 in which the polymerization is carried out at a temperature between 195 and 230° C.

7. In a process for the preparation of polymers and copolymers of ethylene by heating a member of the group consisting of ethylene, and mixtures of ethylene and at least one other ethylenically unsaturated monomer copolymerizable therewith, to a temperature above 150° C. at a pressure above 500 atmospheres in the presence of an organic peroxy compound serving to initiate the polymerization reaction, the improvement in which said initiator is 1,1-di(tertiary butylperoxy-)cyclohexane.

8. In a process for the preparation of polymers and copolymers of ethylene by heating a member of the group consisting of ethylene, and mixtures of ethylene and at least one other ethylenically unsaturated monomer copolymerizable therewith, to a temperature above 150° C. at a pressure above 500 atmospheres in the presence of an organic peroxy compound serving to initiate the polymerization reaction, the improvement in which said initiator is 1,1-di(tertiary butylperoxy-)cycloheptane.

9. A process for preparing polyethylene which comprises polymerizing ethylene at a temperature of about 150°–230° C. and a pressure of at least about 500 atmospheres in the presence of an initiating quantity of an organic peroxide having the formula

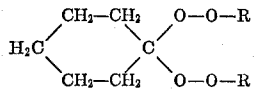

in which R is tertiary alkyl.

10. A process according to claim 9 in which the initiator is 1,1-bis(tertiary-butyl-peroxy)cyclohexane.

References Cited
UNITED STATES PATENTS

| | | | |
|---|---|---|---|
| 2,819,257 | 1/1958 | Kogan | 260—94.9 |
| 3,119,802 | 1/1964 | Guillet et al. | 260—94.9 |
| 3,357,964 | 12/1967 | Gulpen et al. | 260—93.5 S |
| 3,431,247 | 3/1969 | Gulpen et al. | 260—88.2 |
| 3,342,872 | 9/1967 | Gerritsen et al. | 260—610 |
| 3,296,184 | 1/1967 | Portolani et al. | 260—610 |

JOSEPH L. SCHOFER, Primary Examiner

E. J. SMITH, Assistant Examiner

U.S. Cl. X.R.

260—86.7, 87.3, 88.1 PN